United States Patent Office 2,868,727
Patented Jan. 13, 1959

2,868,727

METHOD AND COMPOSITION FOR INHIBITING CORROSION OF METALS

William B. Hughes, Webster Groves, Mo., assignor to Cities Service Research and Development Company, New York, N. Y., a corporation of New Jersey No Drawing. Application December 12, 1955
Serial No. 552,270

8 Claims. (Cl. 252—8.55)

This invention relates to inhibiting corrosion of metals, and is more particularly directed to improved compositions and processes for minimizing the corrosive effect of oil brine mixtures on oil field production and transmission equipment.

It is generally recognized that oil-producing formations often yield with the crude oil a brine which is extremely corrosive in its action upon the oil-producing and collecting equipment, including the metal tubing, casings, pumps, pipe lines, and storage equipment. This type of corrosion is particularly noticeable in wells producing brine which contain varying amounts of hydrogen sulfide, carbon dioxide, and other acidic materials.

Considerable effort has been directed in the past to reducing the cost of maintaining production and collection equipment free of corrosion by inrtoducing into the well various neutralizer solutions such as caustic soda or other alkaline solutions. Other water-soluble corrosion inhibitors have also been used such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water since substantially the same concentration of the inhibitor must be maintained in the water phase in both types of wells in order to prevent corrosion.

It is accordingly an object of this invention to provide new and improved corrosion inhibiting compounds having properties and characteristics which make them uniquely effective in minimizing and reducing corrosion in wells producing oil-brine mixtures, and particularly reducing corrosion in wells.

I have discovered that certain improved compositions prepared by reacting diethylene triamine with urea or thiourea provide exceptionally fine corrosion inhibiting properties when the intermediate imidazolone product of the triamine-urea reaction is further reacted with an acid anhydride, to provide on the imidazolone ring side chain a pyrolinedione; an aldehyde to provide an imine substitutent on the imidazolone ring side chain; or an acid to provide an amide or acid salt substituent on the imidazolone side chain. The various substituents referred to are obtainable by reacting the terminal amine group of the side chain of the intermediate imidazolone reaciion product with an acid anhydride, aldehyde or acid, as hereafter described.

The general structure of the new compounds which I have found to possess most effective corrosion inhibiting properties is as follows:

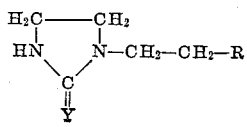

wherein Y is oxygen or sulfur, depending on whether the urea or thiourea is used in forming the intermediate imidazolone ring structure, and R is a pyrolinedione, an imine, an amide or an acid salt substituent.

In preparing compounds of this type, equimolar amounts of urea or thiourea and an aqueous solution of diethylene triamine are first reacted, with water and ammonia being removed from the reaction zone by distillation. The reaction product N-aminoethylimidazolone or N-aminoethylimidazolene-thione, hereafter referred to as the intermediate reaction products, is then further reacted with a selected acid anhydride, aldehyde or acid to provide the pyrolinedione, imine, amide or acid salt substituent desired.

In order to prepare the imidazolone pyrolinediones or the imidazolenethione pyrolinedione, the terminal amine group of the intermediate reaction product side chain is reacted with an acid anhydride, preferably an acid anhydride selcted from the group comprising maleic anhydride, phthalic anhydride or succinic anhydride. This reaction is accomplished by removing one mol of water from the reaction zone upon reaction of the intermediate reaction product with the acid anhydride.

In preparing the imidazolone imines or the imidazolenethione imines, the terminal amine of the imidazolone side chain is reacted with an aldehyde with the removal of one mol of water to provide the imine structure. In preparing these compounds, I have found that any aldehyde compound of from about 1 to about 15 carbon atoms can be utilized. Specifically, I have found that imines of the type with which my invention is concerned are most effective in inhibiting corrosion when prepared with an aldehyde selected from the following group: formaldehyde, acetaldehyde, propionaldehyde, heptaldehyde, ethylhexaldehyde, butyraldehyde and benzaldehyde.

In preparing the imidazolone amides or imidazolenethione amides, the intermediate product obtained by reacting the triamine and urea or thiourea is further reacted with a molar amount of a monocarboxylic acid, with one mol of water being removed from the reaction mixture for each mol of acid utilized in converting the terminal amine group to an amide. In preparing the substituted amides of my invention, I have found that the following acids can be utilized: acetic, propionic, butyric, valeric, caproic, heptoic, octanoic, nonoic, lauric, myristic, palmitic, stearic, oleic, linolenic, benzoic, ricinoleic, teraphthalic. Of the foregoing I have found that oleic, palmitic, ricinoleic and benzoic acids are preferred.

If in the preparation of the foregoing amide compounds, water is not removed from the reaction zone as by heating to form the amide, the acid salt will be obtained. These acid salt compounds are also most effective corrosion inhibitors, as will hereafter be demonstrated.

In order to more thoroughly understand the nature of the compounds of my invention, the examples which follow are provided. In each example, proof of the basic ring structure has not been repeated. The preparation of the n-aminoethyl imidazolone, which is utilized as the intermediate reaction product to formulate the compounds of my invention, is carried out according to the reaction described by C. E. Sweitzer, Journal of Organic Chemistry, 15, 471–474 (1950). In the method described by Sweitzer, equimolar quantities of urea and a 68 weight percent aqeous solution of diethylene triamine are mixed, with the mixture being allowed to reflux so that water and ammonia, which are liberated in the reaction, can be removed from the reaction zone. At the end of a 5 hour heating period all of the water and ammonia have been removed. The temperature of the reaction mass is then increased slowly to 250° C. to insure complete removal of water and ammonia, and is then allowed to cool. The product n-aminoethyl imidazolone is a light yellow, viscous liquid. It has a molecular weight by the method of Rast (Ber. 55, 1051, 3727; 1922) of 127. The theoretical molecular weight is 129. The structure of this material was further confirmed by a qualitative test for the imidazolone structure. This test is based on the work of Morgan and Burstall, J. Chem. Soc. 1928, 143–55, in which it was shown that compounds with $2NH_2$ groups and a thiocarbonyl group or a carbonyl group give complex materials of the type $(Cu2tu)$ $NO_3.H_2O$ $(Cu5tu)$ $NO_3.1$ or $2H_2O$, or $(Cu11tu)$ $NO_3.8H_2O_4$ where tu is the heterocyclic ring compound, when reacted with copper nitrate in acidic media. When a sample of the compounds containing an imidazolone structure are added to a 10% copper nitrate solution which has been acidified with hydrochloric acid, a colorless, gelatinous material forms which is specific for the five membered ring with a double bonded sulfur or oxygen attached.

The preparation of the intermediate imidazolenethione compound or specifically n-aminoethyl imidazolinethione is accomplished in the same manner as that described above, substitution of thiourea for normal urea. Reaction conditions remain the same and the product is similar in all respects with the exception of sulfur being substituted for oxygen on the normal imidazolone ring.

In order to more fully and completely understand this invention and more particularly the manner in which the improved compositions thereof are obtained, the following specific examples are provided:

EXAMPLE 1

Using the method described by Sweitzer, an equimolar quantity of urea (1.0 mol) and diethylene triamine (1.0 mol) were mixed. The triamine was used as a 68 weight percent aqueous solution. The mixture was allowed to reflux while water was slowly removed and ammonia liberated in the reaction allowed to escape. At the end of a 5 hour heating period, all of the water had been removed and the reaction mass was then increased slowly slowly in temperature to 250° C. On cooling the imidazolone product, a light yellow, viscous liquid was obtained having a molecular weight of 127. To 12.7 grams (0.1 mol) of the imidazolone product, 50 ml. of toluene and 9.8 grams (0.1 mol) of maleic anhydride were slowly added. When the addition was completed and the violent reaction had ceased, heat was slowly applied and the reaction mixture refluxed under a water trap condenser for a period of 2 hours to distill the water-toluene azeotrope. The toluene was continuously returned to the reaction mixture through a decanter still head. At the end of the reaction period, 17 grams of water had been removed. The toluene was then removed by distillation leaving a brown, viscous liquid having a molecular weight of 205. The theoretical molecular weight for this imidazolone-pyrolinedione is 207.

The corrosion inhibiting properties of this compound were tested and the results thereof recorded in Table I which follows. The product is identified therein as inhibitor No. 1. In the foregoing example the removal of water is accomplished by the formation of an azeotrope, preferably with an azeotrope forming solvent such as benzene, toluene or xylene. Depending on the particular solvent selected, the refluxing will be carried out at a temperature generally from about 80° C. to about 110° C.

EXAMPLE 2

According to the method described in Example 1, 14.8 grams (0.1 mol) of phthalic anhydride was reacted with 12.7 grams (0.1 mol) of the intermediate imidazolone product of Example 1 to produce a light brown, oil-soluble product identified as inhibitor No. 2 in Table I which follows.

EXAMPLE 3

Following the procedure of Example 1, 10 grams (0.1 mol) of succinic anhydride was reacted with 12.7 grams (0.1 mol) of the intermediate imidazolone product of Example 1 to provide a final reaction product similar to the products obtained in Examples 1 and 2 which product is identified as inhibitor No. 3 in Table I.

The effectiveness of the new compounds of my invention described above, and those which are hereinafter described, in reducing the corrosiveness of oil field brine may be more fully understood by reference to certain tests which I have conducted, using prepared brines to substantially duplicate well conditions. This test hereafter described is generally referred to as the static test since no movement of test strips is made after the test strip has been immersed in the brine. This is to be contrasted with the dynamic test described in my copending application Ser. No. 552,264, filed December 12, 1955, wherein the test strip is continuously dipped in the brine over a fixed period of time.

The test procedure used herein involved a measurement of the corrosive action of a hypothetical well fluid as inhibited with compositions described above upon weighed, cleaned, and polished strips of number 18 gauge cold rolled steel measuring one-quarter inch by four inches, under conditions closely approximating those existing in a producing well and a comparison thereof with the results obtained by subjecting identical strips to the corrosive action of my hypothetical well fluid without inhibitor added.

The test includes the use of a number of bottles or flasks sufficient to provide one for the testing of corrosion inhibitors in varying amounts, and one for comparison for each of the corrosion inhibitors being tested. To cleaned and numbered one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about one hour to purge any oxygen present. After the purging was completed, the corrosive inhibitor being tested was added to each flask in amounts ranging from 10 to 50 p. p. m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measure of the effectiveness of the inhibitor compositions; thus a protection percent may be calculated for each of the test strips taken from the inhibited test fluids in accordance with the following formula:

$$\frac{L1-L2}{L1} \times 100 = \text{percent protection}$$

in which L1 is the loss in weight of strips taken from uninhibited test fluids, and L2 is the loss in weight of strips which were subjected to inhibited test fluids.

Following the test procedure outlined above, the compounds prepared according to Examples 1, 2, and 3 were tested as corrosion inhibitors. The results of these tests are recorded in Table I which follows. It will be noted that a comparison with two standard commercial inhibitors is provided to demonstrate the superiority of my new corrosion inhibiting compounds over those commercial products presently available.

It is to be further noted that hereinafter all corrosion inhibiting test results recorded in the tables which follow were obtained on the basis of the previously described tests.

Table I

| Inhibitor No. | Acid Anhydride Used | Percent Protection | | |
|---|---|---|---|---|
| | | 25 p. p. m. | 10 p. p. m. | 5 p. p. m. |
| 1 | Maleic OCOCH=CHCO | 99.7 | 97.8 | 91.3 |
| 2 | Phthalic C₆H₄(CO)₂CO | 94.3 | 92.1 | 83.1 |
| 3 | Succinic (CH₂CO)₂O | 96.2 | 93.8 | 90.9 |
| Com. A | Standard Inhibitor | 80.2 | 51.6 | |
| Com. B | ---do--- | 81.3 | 47.3 | 12.8 |

EXAMPLE 4

Following the procedure previously described in Example 1, an intermediate (imidazolenethione) product was obtained by reacting an equimolar quantity of thiourea with 68 weight percent aqueous solution of diethylene triamine. After removal of ammonia and water from the reaction mixture and cooling of the same, a light yellow, viscous liquid having molecular weight of 143, according to the method of Rast (Ber. 55, 1051, 3727; 1922) was obtained. The theoretical molecular weight for the imidazolenethione obtainable by reacting thiourea and diethylene triamine in the quantities specified is 145. The structure of this product was confirmed by the qualitative tests for the imidazolenethione structure previously described which is based on the work of Morgan and Burstall.

To 14.3 grams (0.1 mol) of the intermediate imidazolenethione product 50 ml. of toluene and 9.8 grams (0.1 mol) of maleic anhydride were slowly added. When the addition was completed and the violent reaction had ceased, heat was slowly applied and the reaction mixture refluxed under a water trap condenser for a period of 2 hours to distill the water-toluene azeotrope with toluene being continuously returned to the reaction mixture through a decanter still head. At the end of the reaction period, approximately 17 grams of water had been removed from the reaction mixture representing substantially the theoretical amount of water obtainable in the reaction of the acid anhydride ring oxygen with the hydrogen of the terminal amine group on the imidazolenethione side chain. The toluene was then removed by distillation leaving a brown, viscous liquid having a molecular weight, according to the method of Rast, of 219. The theoretical molecular weight for the imidazolenethione-pyrolinedione obtainable by the reaction of the intermediate imidazolenethione product with maleic anhydride is 223. This product was tested as a corrosion inhibitor and provided the protection noted for inhibitor No. 1 in Table II which follows.

EXAMPLE 5

Following the procedure of Example 4 above, 14.8 grams (0.1 mol.) of phthalic anhydride was reacted with 14.3 grams (0.1 mol) of the intermediate imidazolenethione product of Example 4 to produce an oil-soluble product identified as inhibitor No. 2 in Table II which follows.

EXAMPLE 6

Following the procedure of Example 4 above, 10 grams (0.1 mol) of succinic anhydride was reacted with an equimolar amount of the intermediate imidazolenethione product to produce a reaction product identified as corrosion inhibitor No. 3 in Table II which follows.

Table II

| Inhibitor No. | Acid Anhydride Used | Percent Protection | | |
|---|---|---|---|---|
| | | 25 p. p. m. | 10 p. p. m. | 5 p. p. m. |
| 1 | Maleic OCOCH=CHCO | 99.9 | 99.1 | 96.4 |
| 2 | Phthalic C₆H₄(CO)₂CO | 93.8 | 90.1 | 86.4 |
| 3 | Succinic (CH₂CO)₂O | 94.2 | 91.1 | 89.1 |
| Com. B | Standard Inhibitor | 80.4 | 45.1 | 10.6 |
| Com. C | ---do--- | 88.6 | 50.5 | 19.6 |

EXAMPLE 7

To 12.7 grams (0.1 mol) of the intermediate imidazolone product prepared according to the method described in Example 1, 11.4 grams (0.1 mol) of heptaldehyde were added with 50 ml. of toluene. The mixture was heated under a water trap condenser to distill the water-toluene azeotrope with toluene being continuously returned through a decanter still head to the reaction mixture. After 6 hours approximately 18 grams of water had been collected, representing the theoretical quantity of water which would be split out by the conversion of the aldehyde to an imine. The product obtained was a viscous, oil-soluble liquid having an average molecular weight of 220. The theoretical molecular weight for this imidazolone-imine product is 223. This product was tested as a corrosion inhibitor and is identified as inhibitor No. 2 in Table III.

EXAMPLE 8

According to the procedure of Example 7, 7.2 grams (0.1 mol) of butyraldehyde was added to 12.7 grams (0.1 mol) of the intermediate imidazolone product. After a 3 hour reaction period, an imidazolone-imine product was recovered having a molecular weight of 178. The theoretical molecular weight for the imidazolene-imine reaction product of butyraldehyde, and the particular imidazolone used, is 181. This product is identified as inhibitor No. 4 in Table III which follows.

EXAMPLE 9

Using the procedure previously described in Examples 1 and 7, 3 grams of paraformaldehyde was reacted with 12.7 grams of the intermediate imidazolone product to produce a final reaction product having a molecular weight of 135 compared to the theoretical molecular weight of 139. The corrosion inhibiting properties of this compound were tested and are recorded in Table III for inhibitor No. 1.

EXAMPLE 10

Following the method of Examples 1 and 7 above, 10.6 grams of benzaldehyde was reacted with 12.7 grams of the intermediate imidazolone product to produce a viscous liquid reaction product having a light yellow color. This product is identified as inhibitor No. 5 in Table III.

Table III

| Inhibitor No. | Aldehyde Used | Percent Protection | |
|---|---|---|---|
| | | 25 p. p. m. | 50 p. p. m. |
| 1 | Formaldehyde | 27.3 | 80.0 |
| 2 | Heptaldehyde | 82.4 | 96.7 |
| 3 | Ethylhexaldehyde | 82.8 | 97.7 |
| 4 | Butyraldehyde | 80.9 | 95.4 |
| 5 | Benzaldehyde | 88.3 | 99.1 |
| Com. A | Standard Inhibitor | 88.6 | 90.8 |

EXAMPLE 11

To 14.3 grams (0.1 mol) of the imidazolenethione obtained by the reaction of diethylene triamine and thiourea (see Example 4), 11.4 grams (0.1 mol) of heptaldehyde were added. To this mixture 50 ml. of toluene were added and the mixture heated under a water trap condenser to distill the water-toluene azeotrope with toluene being continuously recovered. After 6 hours 18 grams of water had been collected, representing the theoretical quantity of water obtainable by the conversion of the aldehyde to an imine. Toluene was removed by distillation and a viscous, oil-soluble liquid, having a molecular weight of 235, obtained. This product, an imidazolenethione-imine, has a theoretical molecular weight of 239. Tested as a corrosion inhibitor, the product provided the protection noted for inhibitor No. 3 in Table IV.

EXAMPLE 12

Following the procedure of the preceding example, 7.2 grams of butyraldehyde was added to 14.3 grams of the intermediate imidazolenethione. The aldehyde reacted smoothly. In about 3 hours a final reaction product was produced having a molecular weight of 194. The theoretical molecular weight value for this compound is 197. This compound is identified as inhibitor No. 2 in Table IV.

EXAMPLE 13

Following the procedure of Example 11, 3.0 grams of paraformaldehyde was reacted with 14.3 grams of imidazolenethione to produce a final reaction product having a determined molecular weight of 154. The theoretical molecular weight for this compound is 155. The final reaction product identified as corrosion inhibitor No. 1 in Table IV which follows provided the protection noted therein.

EXAMPLE 14

According to the method described in Example 11, 10.6 grams of benzaldehyde was reacted with 14.3 grams of imidazolenethione. The product, a viscous liquid having a light yellow color, had a molecular weight of 230. The product is identified as inhibitor No. 4 in Table IV which follows.

Table IV

| Inhibitor No. | Aldehyde Used | Percent Protection | |
|---|---|---|---|
| | | 25 p. p. m. | 50 p. p. m. |
| 1 | Formaldehyde (HCHO) | 26.9 | 78.9 |
| 2 | n-Butyraldehyde ($C_3H_7CHO$) | 81.8 | 96.8 |
| 3 | Heptaldehyde ($C_6H_{13}CHO$) | 80.2 | 97.3 |
| 4 | Benzaldehyde ($C_6H_5CHO$) | 90.2 | 98.9 |
| Com. A | Standard Inhibitor | 87.9 | 90.1 |

EXAMPLE 15

12.7 grams (0.1 mol) of the imidazolone intermediate product obtained by the reaction of diethylene triamine and urea as described in Example 1 was reacted with 28 grams (0.1 mol) of oleic acid in the presence of 50 ml. of toluene. After a 5 hour refluxing, 18 grams of water had been collected representing the theoretical quantity of water obtained in the conversion of the acid carboxyl group to an amide. Toluene was removed by distillation leaving a viscous, oil-soluble liquid reaction product having an average molecular weight of 392. The theoretical molecular weight for the imidazolone-amide obtained by the above reaction is 399. This product was tested as a corrosion inhibitor and the results of its effectiveness are recorded in Table V which follows.

EXAMPLE 16

Following the procedure of the preceding example, 6 grams (0.1 mol) of acetic acid was reacted with 12.7 grams (0.1 mol) of the intermediate imidazolone product, and after a 2 hour reaction period produced a product having a molecular weight of 169 which is the theoretical molecular weight for the imidazolone-amide obtainable by the reaction of the foregoing reactants. This product is identified as inhibitor No. 3 in Table V which follows.

EXAMPLE 17

Palmitic acid was substituted for acetic acid in the same molecular ratio, 25.6 grams of acid to 12.7 grams of imidazolone. The product obtained is identified as inhibitor No. 4 in Table V.

EXAMPLE 18

According to the method of Example 15, 29.8 grams of ricinoleic acid was reacted with 12.7 grams of the intermediate imidazolone to produce an oil-soluble, syrupy liquid product having a molecular weight of 401. The theoretical molecular weight for the imidazolone-amide obtainable by the reaction of the foregoing reactants is 407. Corrosion inhibitor No. 5 in Table V shows the corrosion inhibiting effectiveness of this compound.

EXAMPLE 19

With 12.2 grams of benzoic acid, 12.7 grams of imidazolone was reacted under the conditions described in Examples 1 and 15 to provide a light yellow colored viscous liquid reaction product having a molecular weight of 229. The protection against corrosion afforded by this product is shown in Table V wherein this reaction product is identified as inhibitor No. 6.

Table V

| Inhibitor No. | Acid Used | Percent Protection | |
|---|---|---|---|
| | | 50 p. p. m. | 25 p. p. m. |
| 1 | None | 78.1 | 19.0 |
| 2 | Oleic ($C_{17}H_{33}COOH$) | 92.3 | 81.4 |
| 3 | Acetic ($CH_3COOH$) | 85.0 | 22.7 |
| 4 | Palmitic ($C_{15}H_{31}COOH$) | 91.8 | 80.8 |
| 5 | Ricinoleic ($C_{17}H_{32}(OH)COOH$) | 98.9 | 83.8 |
| 6 | Benzoic ($C_6H_5COOH$) | 98.4 | 87.5 |
| Com. A | Standard Inhibitor | 91.2 | 78.2 |

EXAMPLE 20

To 14.3 grams (0.1 mol) of the imidazolenethione prepared by the reaction of diethylene triamine and thiourea, 28 grams (0.1 mol) of oleic acid were added. 50 ml. of toluene was added to the reaction mixture in order to remove water from the mixture as a water-toluene azeotrope. After a 5 hour refluxing, 18 grams of water had been collected representing the theoretical quantity of water obtainable by the conversion of the acid carboxyl group to an amide. The azeotrope forming solvent was removed by distillation and a viscous, oil-soluble liquid reaction product was obtained. A molecular weight determination showed the imidazolenethione-amide product to have a molecular weight of 404. The theoretical molecular weight value for the compound obtainable according to the above reaction is 405. This product is identified as inhibitor No. 2 in Table VI.

In a like manner and according to the method described in Example 20 above acetic, palmitic, ricinoleic, benzoic, and butyric acids were reacted in 0.1 molar quantities with an equimolar amount of the imidazolenethione to provide the compounds identified as inhibitors Nos. 3, 5, 6 and 4 in Table VI which follows.

*Table IV*

| Inhibitor No. | Acid Used | Percent Protection | |
|---|---|---|---|
| | | 50 p. p. m. | 25 p. p. m. |
| 1 | None | 78.1 | 19.0 |
| 2 | Oleic | 90.3 | 79.3 |
| 3 | Acetic | 82.3 | 20.1 |
| 4 | Butyric | 97.8 | 80.9 |
| 5 | Palmitic | 98.6 | 82.0 |
| 6 | Benzoic | 99.1 | 81.4 |
| Com. A | Standard Inhibitor | 89.1 | 86.5 |

EXAMPLE 21

To 1 mol of the imidazolone reaction product obtainable according to the reaction described in Example 1, 280 grams (1.0 mol) of oleic acid were added. Contrary to the procedure described in the preceding examples, no water was removed from the reaction mixture. The imidazolone acid salt obtained was tested as a corrosion inhibitor and provided the protection indicated for inhibitor No. 1 in Table VII which follows.

In a like manner acid salts of aminoethyl imidazolone were prepared as described in Example 21 by reacting equimolar amounts of the aminoethyl imidazolone with the following acids: palmitic, ricinoleic, benzoic, acetic and butyric. These reaction products were tested as corrosion inhibitors and are identified as 2, 3, 4, 5 and 6 in Table VII which follows.

*Table VII*

| Inhibitor No. | Acid Constituent | Molar Ratio | Percent Protection | |
|---|---|---|---|---|
| | | | 25 p. p. m. | 50 p. p. m. |
| 1 | Oleic ($C_{17}H_{33}COOH$) | 1:1 | 92.4 | 97.8 |
| 2 | Palmitic ($C_{15}H_{31}COOH$) | 1:1 | 90.8 | 95.8 |
| 3 | Ricinoleic ($C_{17}H_{32}(OH)COOH$) | 1:1 | 94.8 | 98.6 |
| 4 | Benzoic ($C_6H_5COOH$) | 1:1 | 89.6 | 92.1 |
| 5 | Acetic ($CH_3COOH$) | 1:1 | 20.1 | 82.3 |
| 6 | Butyric ($C_3H_7COOH$) | 1:1 | 80.9 | 97.8 |

EXAMPLE 22

The imidazolenethione prepared by the 1:1 molar reaction of thiourea with diethylene triamine, as described in Example 4, was converted to an oleate salt by the addition of 1 mol of oleic acid to 1 mol of the imidazolenethione. No external heat was applied so that no water was removed from the reaction thus forming the acid salt. The product tested as a corrosion inhibitor is identified as inhibitor No. 1 in Table VIII.

*Table VIII*

| Inhibitor No. | Acid Constituent | Molar Ratio | Percent Protection | |
|---|---|---|---|---|
| | | | 25 p. p. m. | 50 p. p. m. |
| 1 | Oleic | 1:1 | 96.8 | 98.8 |
| 2 | Palmitic | 1:1 | 95.6 | 97.9 |
| 3 | Ricinoleic | 1:1 | 97.9 | 99.1 |
| 4 | Benzoic | 1:1 | 97.8 | 98.8 |
| 5 | Acetic | 1:1 | 88.3 | 92.1 |
| 6 | Butyric | 1:1 | 93.1 | 96.3 |
| Com. A | Standard Inhibitor | | 76.1 | 89.1 |

Following the procedure of Example 22, salts of the following acids were prepared by reaction of the acid with the intermediate aminoethyl imidazolenethione. The acids are: palmitic, ricinoleic, benzoic, acetic and butyric. These products are identified as inhibitors Nos. 2, 3, 4, 5, and 6 respectively in Table VIII above.

In using my improved compositions for protecting the piping, casings, and other equipment which comes in contact with the corrosive fluids, I have found that excellent results may be obtained by injecting an appropriate quantity, generally not more than 100 p. p. m., of a selected corrosion inhibiting compound into a producing well so that it may mingle with the oil brine mixture and come into contact with the producing equipment. If desired, the inhibiting composition may be introduced directly into the top of the casing and be permitted to flow down into the well, and thence back through the tubing and into related apparatus. I have found that if this procedure is followed, substantial reduction in corrosion throughout the entire production and collecting system may be obtained.

The nature of the inhibiting action of my improved composition is not fully understood, but apparently the substituted imidazolone or substituted imidazolenethione compounds of this invention preferentially wet the surface of the metal equipment with oil, thus excluding the brine from contact with the metal. In any event, however, despite the lack of a complete understanding of the mechanics of the inhibiting effect, the new structures of my invention are extremely and surprisingly effective in protecting oil well and oil field equipment from corrosion, even when used in amounts of 50 p. p. m. or less, based on the oil content of the well fluid.

It is to be understood that the improved compositions of my invention are not limited to use alone or singly and may be applied along with other agents commonly introduced in the producing oil wells for breaking emulsions, preventing scaled formation, minimizing pitting, etc. It is further evident that my invention is not restricted to the use of improved compositions for inhibiting corrosion in oil wells, but may be employed to perform this function in the presence of corrosive fluids derived from many other sources.

Having now described my invention, what I claim as new and useful is:

1. As a new composition of matter, a compound having the formula

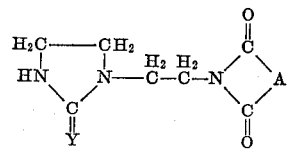

wherein Y represents a member of the group consisting of O and S, and A represents a member of the group consisting of $C_2H_2$, $C_2H_4$, and $C_6H_4$.

2. As a new composition of matter, a compound having the formula

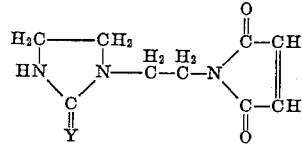

wherein Y is O.

3. As a new composition of matter, a compound having the formula

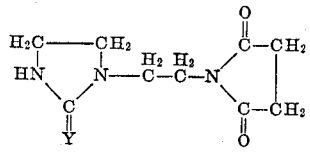

wherein Y is O.

4. As a new composition of matter, a compound having the formula

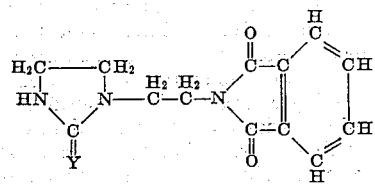

wherein Y is O.

5. A method of controlling corrosion of metals exposed to the action of corrosive fluids, which comprises introducing into the corrosive fluids a small quantity sufficient to inhibit corrosion of a compound having the formula

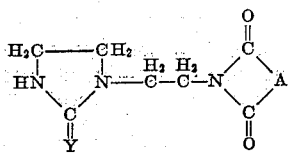

wherein Y represents a member of the group consisting of O and S, and A represents a member of the group consisting of $C_2H_2$, $C_2H_4$, and $C_6H_4$, and thereafter causing the corrosive fluids to flow in contact with the metal to be protected.

6. The method of controlling corrosion of metals as claimed in claim 5, wherein Y is S and A is $C_2H_2$.

7. The method of controlling corrosion of metals as claimed in claim 5, wherein Y is S and A is $C_2H_4$.

8. The method of controlling corrosion of metals as claimed in claim 5, wherein Y is S and A is $C_6H_4$.

References Cited in the file of this patent

UNITED STATES PATENTS

| | | |
|---|---|---|
| 2,613,211 | Hurwitz | Oct. 7, 1952 |
| 2,643,978 | Hughes | June 30, 1953 |
| 2,727,016 | Hankins et al. | Dec. 13, 1955 |